Jan. 28, 1964  L. W. LERCH ETAL  3,119,489
CONVEYOR POWER CHAIN
Filed Nov. 20, 1958  2 Sheets-Sheet 1
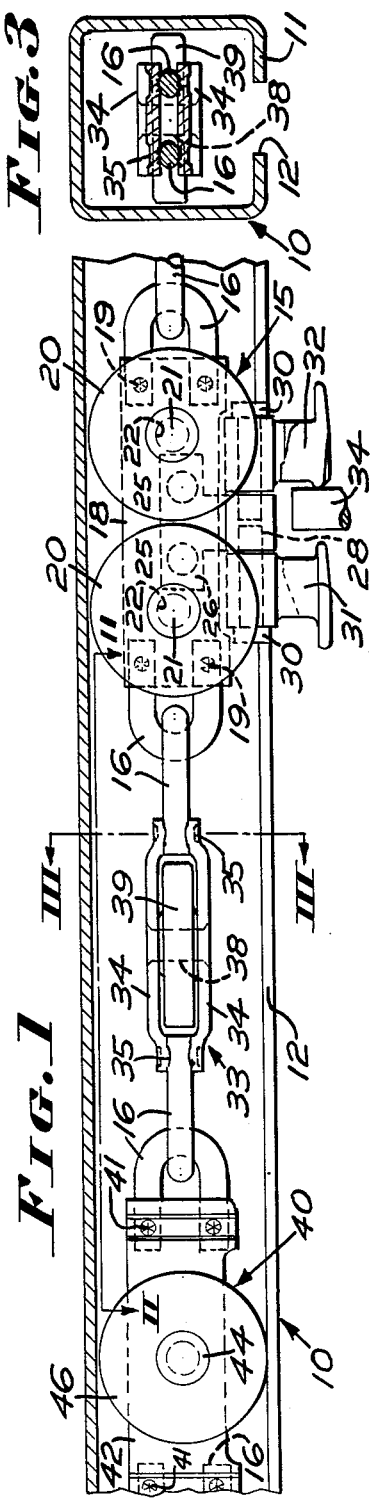
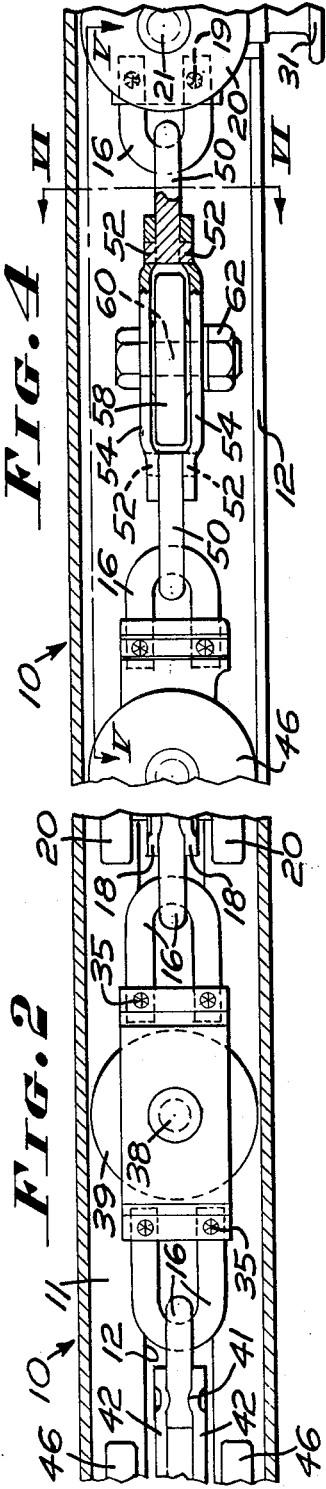
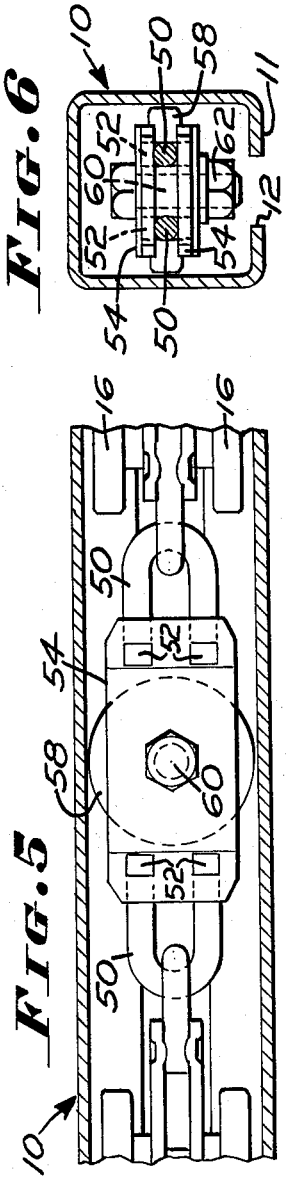

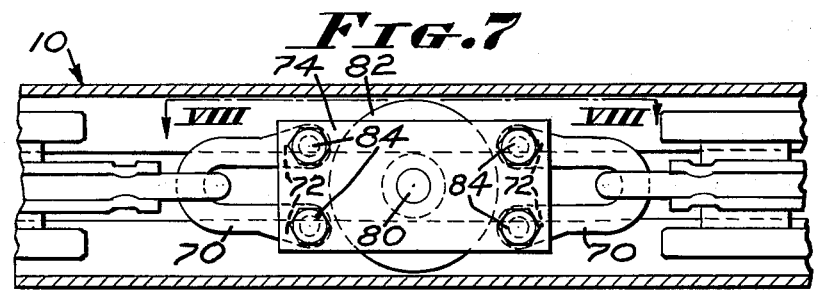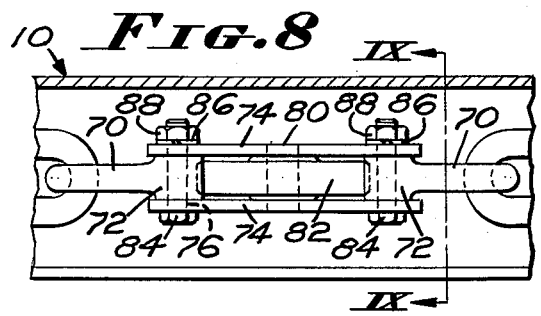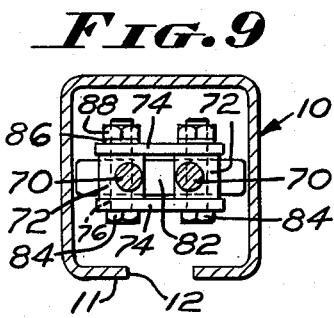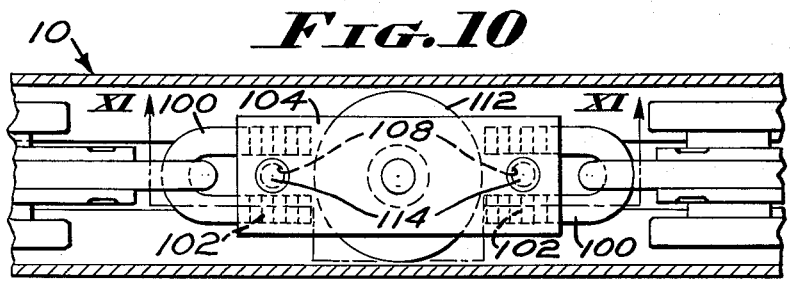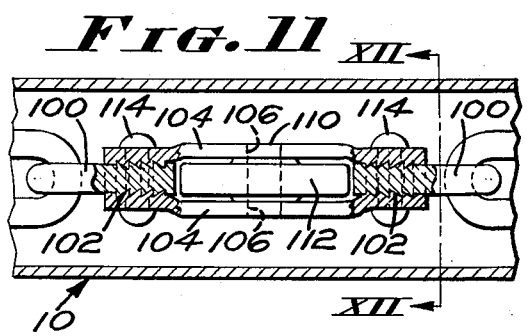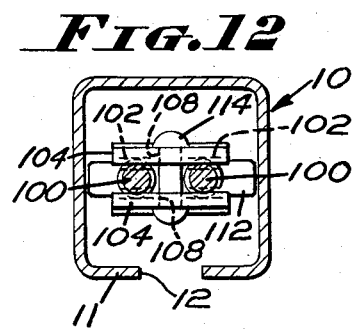

United States Patent Office 3,119,489
Patented Jan. 28, 1964

3,119,489
CONVEYOR POWER CHAIN
Loren W. Lerch and Humphrey F. Parker, Buffalo, N.Y., assignors to Columbus McKinnon Corporation, a corporation of New York
Filed Nov. 20, 1958, Ser. No. 775,248
1 Claim. (Cl. 198—177)

This invention relates to chain-powered conveyors in which power chains are provided with load carrying hangers or pick-up means for moving trolleys, trucks or other objects along trolley rails, tracks, floorways, or the like; for example, as in manufacturing or warehousing operations and more particularly to an elongate bodily rigid linkage component for such chain conveyors. The power chains referred to usually include wheeled drive and guide linkage components alternately disposed in vertical and horizontal attitudes to guide the chain in the track system.

One object of the invention is to provide an improved conveyor power chain linkage component for use in conveyor systems as aforesaid.

Another object is to provide an improved power chain linkage component as aforesaid which is economical to manufacture and easily assembled to provide a durable power chain conveying unit.

Another object of the invention is to provide an improved guide linkage component for power chain conveyors which is of simple design requiring a minimum number of parts and which is inexpensive to manufacture.

Other objects and advantages of the invention will become apaprent from the following specification, wherein the drawing illustrates various forms of the invention, and in which:

FIG. 1 is a fragmentary side elevational view of a conveyor power chain illustrating one form of a linkage component of the invention;

FIG. 2 is a fragmentary top plan view of the chain of FIG. 1, taken on line II—II of FIG. 1;

FIG. 3 is a sectional view taken on line III—III of FIG. 1;

FIG. 4 is a fragmentary side elevational view partly in section, showing another form of a power chain guide linkage component of the invention;

FIG. 5 is a top plan view taken on line V—V of FIG. 4;

FIG. 6 is a sectional view taken on line VI—VI of FIG. 4;

FIG. 7 is a fragmentary top plan view of a power chain showing still another form of power chain guide linkage component construction of the invention;

FIG. 8 is a side elevational view taken on line VIII—VIII of FIG. 7;

FIG. 9 is a sectional view taken on line IX—IX of FIG. 8;

FIG. 10 is a view corresponding to FIG. 7 of another form of power chain guide linkage component of the invention;

FIG. 11 is a sectional view taken on line XI—XI of FIG. 10; and

FIG. 12 is a sectional view taken on line XII—XII of FIG. 11.

Conveying systems of the type to which this invention relates include flexible power chains running in either overhead or underground trackways having load engaging or pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12 to provide opposed track surfaces 11—11 upon which the power chain rollers run, so that the trackway is adapted for overhead conveyor use. However, the slot may be in the top or in either side wall of the track member, depending upon the relative position of the power chain and the work to be conveyed.

The power chain is made up of elongate bodily rigid wheeled linkage components having their wheels alternately disposed in vertical and horizontal attitudes to rollingly support and guide the chain vertically and horizontally in its travel through the track channels. Load engaging or pick-up units are interspersed throughout the length of the chain at required intervals. When the conveyor is being used in overhead relation to the workload, as illustrated for example in the accompanying drawings, the pick-up units will replace vertical guide links; giving the chain the same vertical supoprt and guide action.

As seen in FIG. 1, the load engaging or pick-up linkage components 15 of the chain each comprises a pair of spaced apart U-shaped half-links or part-links 16—16 each having and arcuate intermediate bite-like portion from which there projects leg-like side portions with the leg-like side portions being interconnected together by means of a pair of support or mounting plates 18—18 which are spot or projection welded as indicated at 19 to the half-links at their leg-like portions on each side thereof; and wheel means 20 are journaled on the mounting plates by means of axles 21—21. The two support plates 18—18 are identical and are each formed with apertures 22 for the axles 21. They are also apertured for reception of rivets 25—25 holding a two-part bracket 26 which is formed with an eye portion 28 for receiving pins 30, 30. The pins 30—30 carry dogs 31, 32 in position to intercept the load to be picked up, such as for example through means of a knob 34 extending upwardly from a load carrying means (not shown). In FIG. 1 the dogs 31, 32 and knob 34 are shown in the relative positions they assume when the power chain is moving in a direction from right to left. Both dogs are so constructed that whenever the leading dog engages an object it will be tripped aside to allow the object or contact portion thereof to pass to a position where it will engage the following or driving dog (dog 32 under conditions illustrated). Thus, the load moving arm 34 will be confined between the two dogs, and the leading dog which in this case is the dog 31, will act to prevent the load from advancing at a greater rate of speed than the power chain, such as for example when the load is being moved in a downhill portion of the trackway.

Instead of the specific load pick-up device as illustrated and described hereinabove, any other form of load carrier such as a suspension hook or the like may be attached to the link unit.

The horizontal guide linkage component designated generally at 33, also employs two spaced apart half-links 16—16 each having an arcuate intermediate bite-like portion from which there projects leg-like side portions with a pair of wheel mounting or support plates 34—34 spot or projection welded as indicated at 35 to opposite leg-like side portions of each link. The plates 34—34 are centrally apertured to carry an axle 38 which supports guide wheel means 39 between the mounting plates 34—34.

The vertical guide linkage component designated at 40 also employs two half-links 16—16 against opposite sides of which are spot or projection welded, as indicated at 41, a pair of wheel mounting or support plates 42—42. The plates 42—42 are identical and are formed with central apertures accommodating an axle 44 which mounts wheel means in the form of a pair of wheels 46—46.

A modified form of guide linkage component of the invention is illustrated in FIGS. 4, 5, and 6 wherein spaced apart half-links 50—50, somewhat similar to the half links 16—16, are provided at their leg-like side portions with lateral projections 52 which as shown are square in cross section. A pair of mounting or support plates 54—54 are apertured to slip-fit accommodate the projections 52 of the half-links 50 when the mounting plates are positioned over the ends of the links at each side thereof as shown best in FIGS. 4 and 5. Guide wheel means 58 is positioned in the space between the mounting plates and an axle 60 in the form of a bolt is inserted through central apertures in the mounting plates and through the hub of the wheel. A nut 62 is then applied to the end of the axle to complete the assembly and the mounting plates 54—54 are thereby clamped firmly to the half-links 50—50, resulting in a rugged unitary guide link assembly.

Referring now to FIGS. 7, 8, and 9, another modification of the guide linkage component of the invention is shown wherein spaced apart half-links 70—70, substantially similar to the half-links 16—16, are formed with enlarged eye portions 72 provided in the leg-like side portions and mounting or support plates 74—74 are provided each with a pair of apertures at each end thereof in registry with the eye portions of the half-links when positioned as shown. The mounting plates are also provided with central apertures which receive an axle 80 on which wheel means 82 is mounted to lie between the mounting plates. When the parts are placed in assembled relation bolts 84 are inserted through link and mounting plate apertures and are fastened in place with lock washers 86 and nuts 88. Thus, another form of strong, rigid guide link unit is provided.

Still another modification of the invention is illustrated by FIGS. 10, 11 and 12. In this case spaced apart half-links 100—100, somewhat similar to the half-links 16—16, are provided with serrated leg-like side portions 102—102 which are preferably case hardened. Mounting or support plates 104—104 are provided with central apertures 106 and with end apertures 108. An axle 110 is fitted in the apertures 106—106 to carry the guide wheel means 112 in position between the mounting plates. It will be appreciated that when the mounting plates are pressed in position on each side of the half-link members the serrated portions 102 will bite into the surfaces of the mounting plates. Rivets 114 passing through the apertures 108 and between the legs of the half-links complete the assembly and provide a strong and rigid power chain guide link.

Bolts may, of course, be substituted for rivets, and vice-versa, in any of the modifications of the invention illustrated herein, but, of course, bolts will be used for connecting link purposes. From the above description it will be apparent that the power chain linkage components of the invention will serve to provide power chains which are very strong, flexible, and smooth running; and which may be produced by manufacturing operations and processes of simple and inexpensive nature. Although only a few forms of the invention have been illustrated and described hereinabove, it will be understood that various changes may be made therein without departing from the spirit of the invention or the scope of the following claim.

We claim:

An elongate bodily rigid linkage component for universal interconnection in a conveyor power chain, said linkage component comprising, in combination, a pair of longitudinally spaced apart U-shaped half link-like members each having a pair of leg-like side portions having their ends facing each other and connected to and projecting in a common direction from an arcuate intermediate bite-like end portion, a pair of substantially planar support plates disposed in substantially parallel relationship relative to each other and extending between the leg-like side portions of the link-like members with the end portions of the support plates being in overlapping relationship relative to the respective leg-like side portions of the adjacent link-like member, structure for rigidly securing the leg-like side portions of each of the link-like members intermediate the respective end portion of the support plates with the ends of said leg-like side portions spaced apart a predetermined distance with the bite-like end portions of the link-like members projecting generally longitudinally outwardly in opposed directions with the inner surfaces of the support plates being disposed in spaced parallel relation to define, with the spaced apart ends of said leg-like side portions, a wheel-receiving space, axle means projecting through said support plates centrally between said spaced apart ends of the leg-like side portions and bearing against said support plates to preserve said spaced parallel relation between said inner surfaces of the support plates, and a wheel journalled on said axle means between said support plates within the aforementioned wheel-receiving space.

References Cited in the file of this patent

UNITED STATES PATENTS 2,372,199    Hassler _____ Mar. 27, 1945

FOREIGN PATENTS 1,130,690    France _____ Oct. 1, 1956
738,491    Germany _____ Aug. 18, 1943